United States Patent
Graham

[15] 3,659,651
[45] May 2, 1972

[54] HYDRAULIC FRACTURING USING REINFORCED RESIN PELLETS

[72] Inventor: John W. Graham, Houston, Tex.

[73] Assignee: Esso Production Research Company, Houston, Tex.

[22] Filed: Aug. 17, 1970

[21] Appl. No.: 64,339

[52] U.S. Cl. ............................166/280, 252/8.55 R
[51] Int. Cl. ............................................E21b 43/26
[58] Field of Search............166/280, 308; 252/8.55 R; 260/41 AG

[56] References Cited

UNITED STATES PATENTS

| | | | |
|---|---|---|---|
| 3,149,674 | 9/1964 | Schutze et al. | 166/280 |
| 3,266,573 | 8/1966 | Rixe | 166/280 |
| R23,733 | 11/1953 | Farris | 166/308 UX |
| 3,089,542 | 5/1963 | Kolodny | 166/280 |
| 3,121,464 | 2/1964 | Huitt et al. | 166/280 |
| 3,175,615 | 3/1965 | East et al. | 166/280 |
| 3,254,717 | 6/1966 | Huitt et al. | 166/280 |

OTHER PUBLICATIONS

Modern Plastics 1965 Encyclopedia N.Y., McGraw-Hill, 1964. pp. 567–579.

*Primary Examiner*—Stephen J. Novosad
*Attorney*—James A. Reilly, John B. Davidson, Lewis H. Eatherton, James E. Gilchrist, Robert L. Graham and James E. Reed

[57] ABSTRACT

Fractures in a subterranean formation are propped with propping agent particles composed of a synthetic resin substantially inert to formation fluids and containing reinforcing materials dispersed therein.

12 Claims, 4 Drawing Figures

HYDRAULIC FRACTURING USING REINFORCED RESIN PELLETS

BACKGROUND OF THE INVENTION

1. Field of the Invention

This invention relates to a method of fracturing subterranean formations surrounding oil wells, gas wells and similar boreholes. The method of this invention employs a novel propping agent which permits the fractures to be propped in a partial monolayer pattern.

2. Description of the Prior Art

Hydraulic fracturing is a well stimulation technique designed to increase the productivity of a well by creating fractures in the producing formations surrounding the wellbore. The process involves two basic steps: (1) injecting a fluid at sufficient rate and pressure to rupture the formation thereby creating a crack (fracture) in the reservoir rock, and (2) placing a particulate material (propping agent) in the formation to maintain the fracture in a propped condition. When the pressure in the fracture is relieved, the overburden stresses tend to close the fracture. If stimulation is to occur, the propping agent must have sufficient mechanical strength to bear these closure stresses. The propped fracture provides a high permeability path for conducting formation fluids to the wellbore. Hydraulic fracturing thus achieves stimulation by altering the normal flow pattern of the well drainage area.

The degree of stimulation depends, to a large extent, upon the fracture conductivity which is a function of the width and permeability of the propped fracture. Laboratory experiments have shown that maximum conductivity is obtained when the fracture is propped with a partial monolayer of propping agent particles; that is, when the propping agent particles are sparsely distributed in the fracture to form widely spaced supporting pillars. This arrangement presents little resistant to flow and provides high fracture permeabilities.

Efforts to place the propping agent particles in the fracture in the partial monolayer pattern have not resulted in stimulation of the magnitude consistent with the partial monolayer theory. The problem of particle settling in the fracture has been overcome by the recent development of high-viscosity fluids and gelled water fluids, both of which are capable of suspending large quantities of the propping agent particles. With this problem solved, the main difficulty in propping in accordance with the partial monolayer pattern has been in selecting a propping agent capable of providing the proper pillar effect. The common propping agents, e.g., sand, glass beads, and metal shot, are relatively hard materials which tend to crush or embed in the formation at high closure stresses. Disintegration and/or embedment of the propping agent particles reduces the width of the fracture and consequently produce low fracture conductivities.

The use of soft, deformable particles such as synthetic resin pellets, walnut shells, or other organic materials has also been proposed. The difficulty with these materials, however, is their tendency to grossly deform under high closure stresses. This results in narrow fractures and low conductivities.

Although the partial monolayer concept is sound, it has received only limited success in field application, mainly because the selected propping materials have not exhibited the proper balance of physical properties in providing the pillar effect.

SUMMARY OF THE INVENTION

In accordance with the present invention, it has been found that fractures with surprisingly high conductivities can be obtained by use of propping agents composed of reinforced synthetic resins. As indicated above, synthetic resins without reinforcement have been proposed for use in fracturing operations. These materials, however, have received limited application because of their generally poor dimensional stability, low heat resistance, and low compressive strength. Reinforcing the resin with properly selected materials improves all of these important properties. Reinforced resins are composite structures having a continuous resin matrix and particles of different composition dispersed therein. These composite materials are known in the plastic art as reinforced plastics. Although there is a great deal of confusion surrounding the definitions of "resin" and "plastic," the terms as used herein are interchangeable and encompass a broad class of high polymeric synthetic substances, specifically including thermosets and thermoplastics, but excluding rubber and other elastomers. Particles composed of reinforced plastics have been found to make excellent propping agents when placed in the fracture in a partial monolayer pattern.

The type of resin and type and concentration of reinforcing material making up the composite will depend upon several factors including the anticipated closure stress, formation temperature, and the type of formation fluid. For most applications, however, a wide range of reinforced thermosets and reinforced thermoplastics can be used.

Specific thermosets include epoxy, phenolic, and polyester resin. These resins can be reinforced with conventional reinforcing materials such as glass fibers, asbestos, mica, silica, and alumina.

Thermoplastics are preferred over the thermosets however because, from an operational point of view, they are easier to reduce to pellet form of the size required in fracturing operations. Specific thermoplastics include polyethylene, acrylonitrile-butadiene-styrene, polystyrene, polyvinylchloride, fluoroplastics, polysulfide, polypropylene, styrene acrylonitrile, nylon, and phenylene oxide. Although improvements in specific properties can be provided by use of any of the conventional reinforcing materials, the fibrous reinforcements are preferred because they provide the greatest improvement in compressive strength. The fibrous reinforcement materials include glass, asbestos, natural and synthetic fibers such as nylon and polyvinylchloride, sisal, boron and the like.

DESCRIPTION OF THE PREFERRED EMBODIMENT

Figure 2:
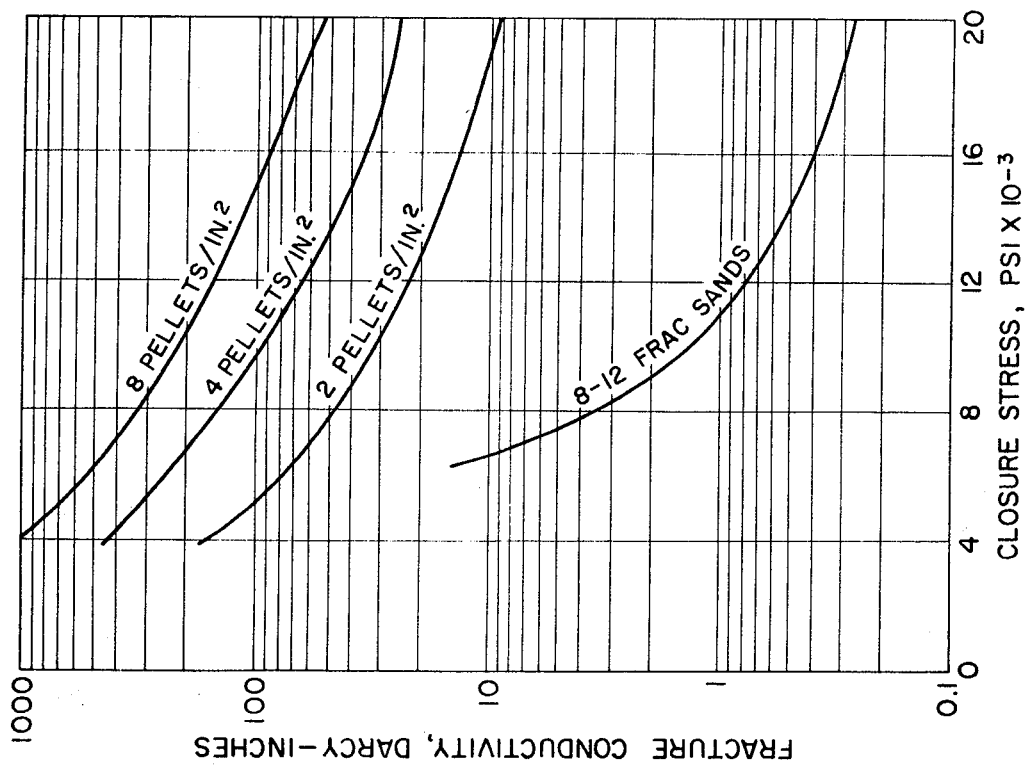
FIG. 2 is a plot comparing fracture conductivities attainable using pellets composed of glass reinforced nylon resin, and 8–12 sand.

Hydraulic fracturing operations are performed by pumping a hydraulic fluid down the cased wellbore into the formation at such pressures and rates to cause the formation rock to fail in tension. The tensile failure creates a fracture oriented perpendicular to the least compressive stress in the formation. Generally, the least compressive stress is horizontal because of overburden; thus, the fractures are generally oriented in a vertical plane. Once the fracture has been created, particulate material known as a propping agent is placed under pressure in the fracture to provide a prop which maintains the fracture open when the fracturing-inducing pressure is relieved. As mentioned above, the maximum conductivity is achieved when the concentration of the propping agent particles is less than that required to form a complete monolayer in the fracture. The particles form widely distributed supporting pillars which present little resistance to flow. In achieving the pillar effect required in the partial monolayer pattern, it has been found that the propping agent must possess certain characteristics not commonly associated with the presently available propping agent materials. The propping agent particles must exhibit a relatively high degree of deformability at low closure stresses and yet be dimensionally stable at high closure stresses. The deformability at the low closure stresses prevents particle embedment in the fracture walls by distributing the compressive load over a wider contact area. As the closure stresses increase, however, it is essential that the particles reach a stable condition in order to provide sufficient fracture width for conducting the formation fluids.

In addition to the requirement of dimensional stability at high closure stress, the propping material must also possess high-temperature strength and be inert to formation fluids. Moreover, the composition of the propping material must be such that it can be reduced to pellet form of the size usable in fracturing operations and by economically feasible processes. In order to enhance suspension of the propping agent particles, it is desirable that the density difference between the particle composition and carrier fluid be small. However, recent developments of fluids capable of suspending large quantities of propping agent particles has somewhat reduced the importance of the material densities.

It has been found that certain reinforced plastics meet all these requirements and when reduced to pellet form make excellent propping agents for fracturing operations. Certain reinforcing materials improve important physical properties of resins such as creep resistance, thermal resistance, compressive strength, and dimensional stability. The type and concentration of the reinforcing material will depend upon the type of resin used and the end effects desired.

Laboratory tests have shown that pellets composed of fiber reinforced resins exhibit relatively good dimensional stability under extreme loading. Initial application of compressive forces causes the pellets to undergo gross deformation. However, after a relatively short period of loading, the pellets reach a dimensionally stable condition. The pellet dimension measured in the direction of applied stress, hereafter referred to as pellet thickness, determines the propped fracture width. The laboratory data indicate that glass reinforced nylon pellets are capable of propping fractures at closure stresses generally considered too high for conventional propping agents. Moreover, these data demonstrate that the reinforced nylon pellets undergo less deformation than unreinforced nylon and therefore retain a larger percentage of original thickness and maintain the fracture in a wider propped condition.

Deformation of the pellets under initial loading is a desirable characteristic, particularly where the pellet distribution within the fracture is by the partial monolayer pattern. In this type of propping, the individual particles are subjected to considerably higher stresses than those in the multilayer pack. The brittle-type proppants such as sand and glass beads tend to crush or embed in the formation at high closure stresses and therefore cannot be used in partial monolayer propping in deep wells. The conventional deformable proppants such as walnut shells and unreinforced plastics do not provide sufficient fracture widths at high closure stresses. The reinforced resin pellets have been found to have a balance of properties between the brittle type and the highly deformable propping agent materials. Particle deformation increases the bearing surface which resists particle embedment and reduces the unit stress on the particle. However, the degree of deformation for reinforced resin pellets is less than that for the unreinforced plastic pellets. Consequently, the fracture walls are propped farther apart.

For partial monolayer packing the relationship of fracture width and fracture conductivity can be represented by:
where $C = 5.38 \times 10^7 \times W^3 \times F$ $C$ is fracture conductivity, darcy-inches;
$W$ is fracture width, inches; and
$F$ is the fraction of fracture area open for flow.

Thus, minor increases in fracture width have a dramatic effect on fracture conductivities and hence, well stimulation.

The reinforced plastics usable in this invention include a variety of reinforced thermosets and reinforced thermoplastics. Some of the reinforced thermosets which exhibit superior dimensional stability, high heat resistance and high compressive strength are listed below:

| Thermostat | Reinforcing Material | Temp. Resistance °F. (continuous) | Compressive strength, psi (A.S.T.M. Test method D-695 |
| --- | --- | --- | --- |
| Polyester | glass | 300–350 | 20,000–30,000 |
| Epoxy | silica | 160–550 | 15,000–35,000 |
| cast resin | alumina | 190–600 | 15,000–33,000 |
| molding compound | glass fiber | 300–350 | 25,000–40,000 |
|  | mineral | 300–500 | 18,000–40,000 |
| Phenol formaldehyde and phenol-furfural molding compound | wood flour and cotton flock | 300–350 | 22,000–36,000 |
|  | asbestos | 350–500 | 20,000–35,000 |
|  | mica | 250–300 | 25,000–30,000 |
|  | glass | 350–550 | 17,000–70,000 |

In addition to the reinforcing materials listed above, sisal, nylon, boron, and metal fibers are conventionally used to reinforce thermosets. The reinforced thermosets can be reduced to pellet form by conventional compressive molding techniques. The reinforcing material in either the fiber or granular form can be premixed with the liquid resin at desired concentrations prior to the molding operations.

Some of the reinforced thermoplastics usable in the present invention are listed below:

| Thermoplastic | Reinforcing Material | Temperature Resistance °F. (continuous) | Compressive Strength, psi (A.S.T.M. Test method D-695) |
| --- | --- | --- | --- |
| Acrylonitrile-butadiene-styrene | 20–40% glass filled | 200–230 | 16,000–27,000 |
| Nylon |  |  |  |
| Type 6 | 6% glass | 180–300 | 13,000 |
| Type 6/10 | 20–40% glass filled | 300–400 | 13,000–24,000 |
| High density Polyethylene | 5–30% glass filled | 210–270 | (no data) |
| Polypropylene | glass reinforced | 300–320 | 5,500–7,000 |
| Modified phenylene oxide | 20–30% glass filled | 260 | 16,500–18,500 |
| Polysulfone | 10–50% glass reinforced | 300 | 13,900 |

As evident from the above table, glass fiber is the most common reinforcement for thermoplastics. Other reinforcing materials include asbestos, meta-silicate, calcium silicate, cellulose, mica, calcine, keoline, talc, as well as fibers of metal, nylon, polyvinylchloride, and other natural or synthetic fiber.

From the foregoing it is apparent that the possible combinations of resins and reinforcing materials are enormous. The particular reinforcement used and its concentration in a particular resin will depend upon the conditions of the formation to be fractured. The following guidelines can be used in selecting the composite suitable for fracturing operations: thermally resistant at temperatures above 200° F; a compressive strength of at least 10,000 psi (by A.S.T.M. Test Method D–695); and exhibit good dimensional stability at high closure stresses.

The reinforced thermoplastics can be reduced to pellet form by conventional extruding techniques. The hardened extrudate can be chopped into any desired length forming generally cylindrical or cubic pellets. At the present, the pelletized reinforced thermoplastics are less costly than the reinforced thermosets and therefore are preferred. Generally, fiber reinforcements have a more significant effect on strength than do the finely divided reinforcing materials. For this reason, the preferred propping agent is composed of thermoplastics reinforced with fibers. Pellets composed of fiber glass reinforced nylon have proven particularly effective in propping fractures. Glass reinforced nylon having glass contents in the range from 6 to 40 weight percent are available in pellet form from several manufacturers including E. I. duPont de Nemours & Company. E. I. duPont de Nemours markets the glass reinforced type 66 nylon at glass loadings of 13 and 33 weight percent under market designations Zytel 7110-13 and Zytel 7110-33, respectively. The material is available in the form of cubic pellets ( ⅛ inch X ⅛ inch X ⅛ inch ) or cylindrical pellets ( 1/10 inch height and 1/10 inch diameter ). The cylindrical pellets correspond to a 6 mesh size on the U. S. Sieve Series.

In placing the propping agent in the fracture, the reinforced plastic particles can be blended into the carrier fluid by conventional techniques and equipment. Useful carrier fluids include water-base fluids, moderate-to-high viscosity oils, and other fluids capable of suspending the particles. Preferred fluids include high viscosity oil or water-in-oil emulsion prepared in accordance with the teachings of U.S. Pat. No. 3,378,074, issued Apr. 16, 1968, and a gelled water containing a high molecular weight polysaccharide prepared in accordance with the teachings of U.S. Pat. No. 3,243,000, issued Mar. 29, 1966.

The low specific gravity (1.0 – 2.0) of the reinforced plastic particles coupled with the high specific gravity and high viscosity of these carrier fluids permit the placement of the propping agent particles in the fracture with very little settling. Particle suspension is essential for obtaining proper particle distribution in the fracture if fracture propping is to be by the partial monolayer pattern.

In order to achieve distribution of the particles in the fracture in accordance with the partial monolayer pattern, the concentration of the particles in the carrier fluid will vary depending upon the fracture geometry, compressive strength of the propping agent, and magnitude of the closure stresses, but will generally fall within the range of from about 1 to about 15 pounds per barrel. If desired, oil-soluble propping agent spacers can be used in combination with the propping agent particles in the manner well known in the art.

As demonstrated above, the propped fracture width has a pronounced effect on fracture conductivity. Therefore, the fracturing treatment should be designed using the largest particle size practicable under the particular well and treating conditions. Large particle size is particularly important when using deformable particles since only a fraction of its original thickness is retained under loading. For propping with reinforced resin pellets, the particle size is preferably in the 4 – 8 mesh range on the U. S. Sieve Series.

The particle size for a particular treatment depends upon the dynamic fracture width attainable during the fracture propagation step of the operation. Experience has shown that the average dynamic width should be about 2 ½ times as large as the propping agent particles. In field tests, dynamic fracture widths have been obtained which permit the placement of reinforced nylon pellets of 6 mesh in size.

Figure 1:
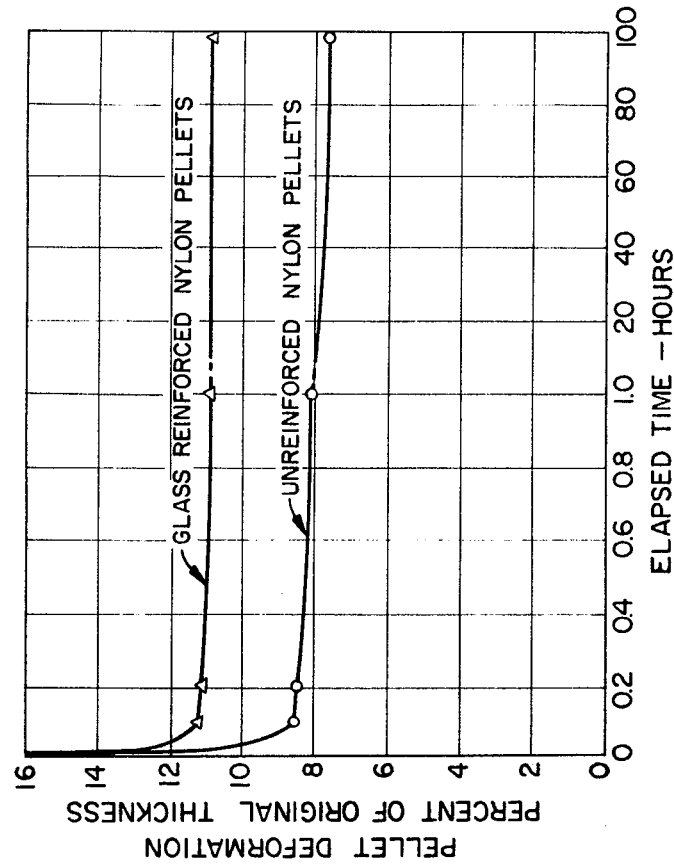
FIG. 1 is a plot showing the creep characteristics of unreinforced and glass reinforced nylon pellets under constant compressive loading.

The manner in which the propping agent particles react to the compressive loading in providing the pillar effect can be predicted by creep properties of the material used. Unlike most other materials, the strength and rigidity of plastics are dependent upon time. The creep pattern of plastics in compression is an important guide in determining whether or not the plastic is suitable for use as a propping agent. Certain reinforcing materials have a dramatic effect upon the creep properties and hence the dimensional stability of plastics. Laboratory experiments were conducted comparing the deformability of pellets composed of glass reinforced and unreinforced nylon. Separate compression tests were run using pellets composed of the reinforced nylon and pellets composed of unreinforced nylon. The reinforced nylon pellets were obtained from E. I. duPont de Nemours & Company under product designation Zytel 7030-33. The pellets were in cylindrical form 0.1 inches long and 0.1 inches in diameter. The nylon was type 66 containing 33 weight percent of short glass fibers. The unreinforced nylon pellets were also obtained from E. I. duPont de Nemours & Company under product designation Zytel 101. The creep data were obtained by subjecting the pellets to a constant compressional load and measuring the dimensions at selected time intervals. The pellets were mounted upright in a compression tool between two steel platens and arranged to provide a pellet concentration of six pellets per square inch. FIG. 1 contains the plots showing the creep pattern for the reinforced and unreinforced nylon pellets at a closure stress of 14,140 pounds per square inch. The plot for the reinforced nylon pellets shows that deformation ceased after one hour of loading, the pellets retaining 11 percent of their original height. It should be pointed out that while the pellets retained only 11 percent of their original heights, the applied stress of 14,140 pounds per square inch is extremely high, corresponding to overburden loads at subsurface depths of 20,000 feet or more. The plot for the unreinforced nylon pellets shows that deformation continued beyond the 100-hour test period with the pellets retaining only 7.8 percent of their original heights. Data from the plots of FIG. 1 indicate that fractures propped with the reinforced nylon pellets will be about 40 percent wider than fractures propped with unreinforced nylon pellets at closure stresses of 14,140 pounds per square inch and a pellet distribution of 6 pellets per square inch. More significantly, the conductivity of a fracture propped with the reinforced nylon pellets will be almost 4 times greater than that for a fracture propped with the unreinforced nylon pellets.

Figure 4:
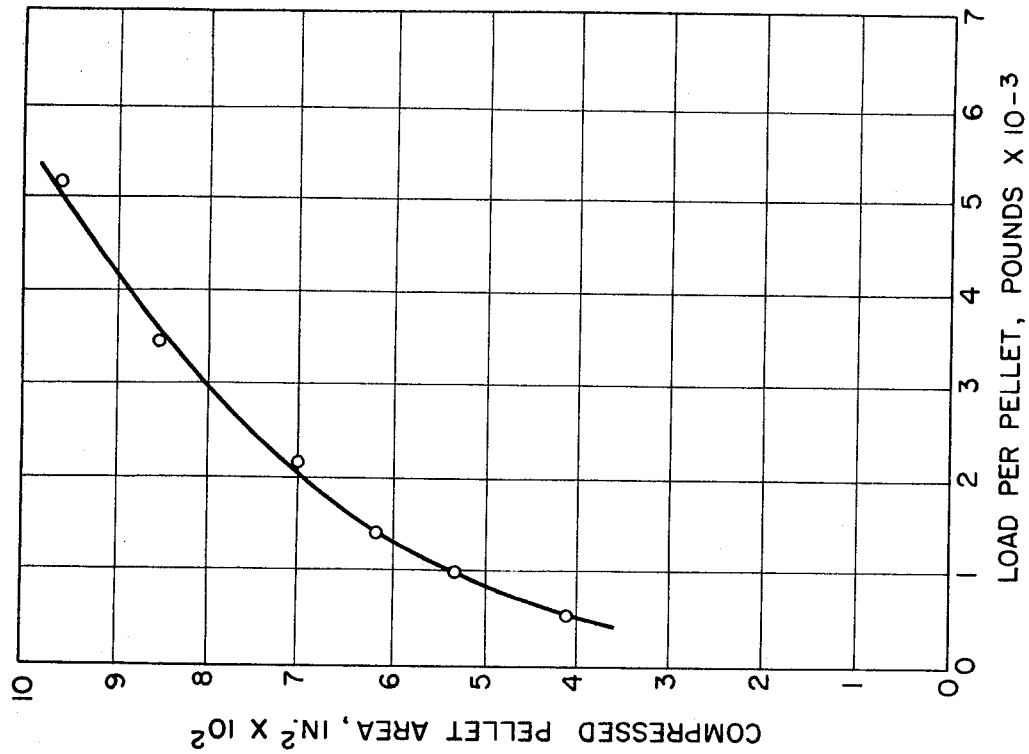
FIGS. 3 and 4 are plots illustrating the behavior of glass reinforced nylon pellets at various stress levels.
Figure 3:
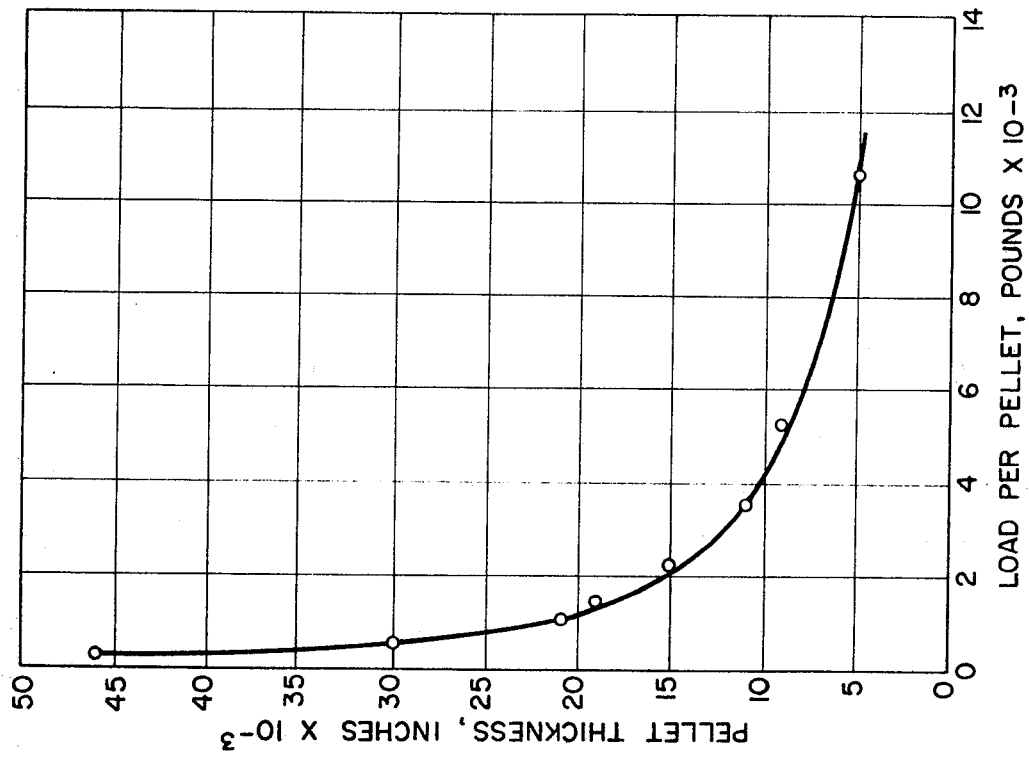

FIG. 2 compares conductivities attainable by use of (1) glass reinforced nylon pellets distributed within the fracture by the partial monolayer pattern and (2) 8 – 12 mesh sand placed in a 0.2 inch fracture by the conventional multilayer pack. The conductivities of the 8 – 12 mesh sand are based upon known permeabilities of the sand at various closure stresses. The conductivities of the glass reinforced nylon pellets are based upon the plots of FIGS. 3 and 4 which, respectively, show the pellet thickness and pellet area for various stresses carried by the pellets. The cylindrical pellets were composed of Zytel 7030-33 and were 0.1 inches long and 0.1 inches in diameter. The glass reinforced nylon pellets for the densities considered provided higher conductivities for all closure stresses but the improvement over 8 – 12 mesh sand was particularly dramatic at high closure stresses. Although the propped fracture widths for the nylon pellets were based upon data obtained from laboratory test data taken at a laboratory temperature of about 72° F, additional compressive tests at 250° F indicated very little difference between the creep properties at the two temperatures. Accordingly, it is believed that the plots in FIGS. 3 and 4 are representative of actual formation conditions.

In carrying out the invention in the field, the formation to be treated will normally first be broken down by pumping water, brine, crude oil, diesel fuel or a similar liquid into the formation at a rate sufficient to develop bottomhole pressures in excess of the formation breakdown pressure. Rates of from about 2 to about 20 barrels per minute are generally adequate, particularly where viscous fluids were used, but somewhat higher rates may sometimes be used in deep, high temperature formations with high permeabilities. Filter loss control agents such as silica flour, lime, talc, guar gum, hydrocarbon resins and the like can be added to the fluid to reduce the pumping rate needed if desired. No propping agent particles are normally used during this initial stage of the operation.

Following initial breakdown of the formation, the injection of fluid is continued until a fracture of the desired length and width has been propagated. The fracture length and width needed and the approximate volume of fluid required to obtain that length will normally be determined at the time the operation is designed. The pressure at the wellhead will generally build up as the fluid is injected and then drop off suddenly as the formation fractures. After all of the initial pad has been injected, this phase of the operation is terminated.

Once the necessary fracture width has been obtained, fluid containing suspended propping agent particles composed of reinforced plastic is injected into the well to prop the fracture. The concentration of the particles in the injected fluid will generally be increased progressively to insure that injection into the fracture takes place without a screen-out. After the propping agent has been placed, the well will normally be shut in to permit leakoff of the fluid and closure of the fracture. The shut-in period required will depend in part upon the viscosity of the fluid in the fracture and the permeability of the surrounding formation but in general a period of from about 8 to 72 hours will be adequate. The well can then be placed on production. The injected fluids will be produced first and several days may be required to accomplish this, particularly if a highly viscous oil is used. Diesel oil, kerosene or other low viscosity petroleum fractions can be injected to dilute the heavy oil and accelerate its production but this is not essential. Where water-base fluids and liquids of low viscosity are used, the cleanup period is normally short.

The following describes application of this method in a gas well producing from an extremely tight formation. The well was completed with 5-inch casing and perforated in the following intervals; 10,686 – 10,690 feet, and 10,714 – 10,725 feet. The fracturing operation was begun by testing this system at 9,700 pounds per square inch. A pad of 500 barrels of field salt water containing 420 pounds of commercial fluid loss additive and 3,500 pounds of potassium chloride was injected into the formation through 2 ⅞ inches tubing at an average rate of 10 barrels per minute to break down the formation and propagate the fracture. A gelled-water fracturing fluid consisting of 1,000 barrels of fresh water, 1,000 pounds of a commercial gelling agent, 1,680 pounds of a commercial fluid loss additive, and 7,000 pounds of potassium chloride was then injected into the formation. After about 750 barrels of the gelled-water fluid was injected, 1,200 pounds of particulate petroleum coke was blended into the stream at a concentration of about 120 pounds per barrel. The coke-fluid slurry was followed by about 240 barrels of the gelled-water fluid. The function of the coke as described and claimed in assignee's copending application entitled "Hydraulic Fracturing Using Petroleum Coke" (Ser. No. 64,338; filed Aug. 17, 1970; inventors J. W. Graham, et al) was to increase the dynamic fracture width. The injection of the gelled-water fluid containing the coke propagated a fracture of sufficient width for receiving the reinforced nylon pellets. The glass reinforced nylon pellets were blended into a carrier fluid consisting of 238 barrels of fresh water, 238 pounds of gelling agent, 95 pounds of a cross-linking agent, 400 pounds of a commercial fluid loss agent, and 1,660 pounds of potassium chloride. The density of the gelled water was about 1.02. The pellets were composed of a type 66 nylon containing 25 weight percent of reinforcing glass fibers and were cylindrical in form having height and diameter of one-sixteenth inch. The specific gravity of the pellets was about 1.3. The low density differences between the carrier fluid and the pellets insured good suspension. The initial concentration of the pellets was 3 pounds per barrel of fluid and was gradually increased to 9 pounds per barrel. A total of 900 pounds of the glass reinforced nylon pellets was injected into the fracture. The pellet concentration provided a sparse distribution of pellets in the fracture and therefore attained propping by the partial monolayer pattern.

Prior to the hydraulic fracturing treatment, the well was incapable of producing for prolonged periods. Following the treatment, the well tested 590,000 standard cubic feet per day and 85 barrels of condensate per day through a 3/16-inch choke.

Although there are several factors which contributed to the large stimulation achieved, it is believed that the placement of the propping agent particles by the partial monolayer pattern which was made possible by the use of glass reinforced nylon pellets was a major contributing factor.

I claim:

1. In a method of propping a hydraulically induced fracture in a subterranean formation surrounding a wellbore, the improvement comprising introducing into said fracture propping agent particles composed of a resin substantially inert to formation fluids and containing a fibrous reinforcing material dispersed therein, the concentration of said fibrous reinforcing material in said particles being between about 6 and about 50 weight percent.

2. The method according to claim 1 wherein said particles are composed of a thermoplastic resin.

3. The method according to claim 2 wherein the thermoplastic resin containing the reinforcing material has a compressive strength of at least 10,000 psi as determined by A.S.T.M. test method D–695.

4. The method according to claim 3 wherein the thermoplastic resin containing the reinforcing material is heat resistant at temperatures to 200° F.

5. The method according to claim 1 wherein the fibrous reinforcing material is glass.

6. The method according to claim 5 wherein said thermoplastic resin is nylon.

7. The method according to claim 1 wherein the particles are placed in the fracture in a concentration to provide a partial monolayer pattern for maintaining the fracture in a propped condition.

8. The method according to claim 7 wherein said particles are 8 mesh or larger in size.

9. A method of fracturing a subterranean formation surrounding a wellbore which comprises injecting a fluid into the formation at a rate sufficient to propagate a fracture therein, injecting into the fracture a fluid containing suspended propping agent particles composed of a synthetic resin having dispersed therein from about 6 to about 50 weight percent of a fibrous reinforcing material, and thereafter permitting the formation to close on said propping agent particles.

10. The method according to claim 9 wherein the resin is nylon.

11. The method according to claim 10 wherein the fibrous reinforcing material includes glass fibers.

12. The method according to claim 9 wherein the concentration of the particles suspended in the fluid is in the range from about 1 to about 15 pounds per barrel of fluid.

* * * * *